US011235513B2

(12) United States Patent
Nakai et al.

(10) Patent No.: US 11,235,513 B2
(45) Date of Patent: Feb. 1, 2022

(54) METHOD FOR MANUFACTURING THREE-DIMENSIONAL STRUCTURE (71) Applicant: Mitsubishi Gas Chemical Company, Inc., Tokyo (JP)

(72) Inventors: Asami Nakai, Gifu (JP); Akio Ohtani, Gifu (JP); Hiroto Ito, Kanagawa (JP); Fumiya Hirano, Kanagawa (JP); Nobuki Hirooka, Kanagawa (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 153 days.

(21) Appl. No.: 16/071,346

(22) PCT Filed: Jan. 16, 2017

(86) PCT No.: PCT/JP2017/001272
§ 371 (c)(1),
(2) Date: Jul. 19, 2018

(87) PCT Pub. No.: WO2017/126477
PCT Pub. Date: Jul. 27, 2017

(65) Prior Publication Data
US 2020/0061906 A1 Feb. 27, 2020

(30) Foreign Application Priority Data

Jan. 22, 2016 (JP) .............................. JP2016-010239

(51) Int. Cl.
*B29C 64/118* (2017.01)
*B33Y 10/00* (2015.01)
(Continued)

(52) U.S. Cl.
CPC ............ *B29C 64/118* (2017.08); *B33Y 10/00* (2014.12); *B33Y 70/00* (2014.12); *B29K 2077/00* (2013.01);
(Continued)

(58) Field of Classification Search
CPC ........ B29C 64/118; B33Y 10/00; B33Y 70/00
See application file for complete search history.

(56) References Cited

U.S. PATENT DOCUMENTS

2013/0252497 A1  9/2013  Schiebel et al.
2014/0061974 A1  3/2014  Tyler
(Continued)

FOREIGN PATENT DOCUMENTS

CA       2904496 A1    4/2015
DE    102010052078 A1  5/2012
(Continued)

OTHER PUBLICATIONS

Turner et al., A review of melt extrusion additive manufacturing processes: I. Process design and modeling, Rapid prototyping journal, 20/3 (2014) pp. 192-204. (Year: 2014).*
(Continued)

*Primary Examiner* — Kelly M Gambetta
(74) *Attorney, Agent, or Firm* — Fitch, Even, Tabin & Flannery LLP (57) ABSTRACT Provided is a method for manufacturing a three-dimensional structure, capable of yielding a three dimensional structure that excels in buildability. The method for manufacturing a three-dimensional structure, comprises melting a filament that contains a thermoplastic resin by using a 3D printer, and depositing it onto a base, and comprising bonding the filament at one end of the filament to a surface of the base so as to achieve a bond strength to the base of 15 N or larger, and discharging the filament through a nozzle of the 3D
(Continued)

printer onto a surface of the base so as to deposit thereon, while moving at least one of the base or the nozzle.

13 Claims, 3 Drawing Sheets

(51) Int. Cl.
*B33Y 70/00* (2020.01)
*B29K 77/00* (2006.01)
*B29K 307/04* (2006.01)
*B29K 309/08* (2006.01)

(52) U.S. Cl.
CPC ...... *B29K 2307/04* (2013.01); *B29K 2309/08* (2013.01)

(56) References Cited

U.S. PATENT DOCUMENTS

| | | | |
|---|---|---|---|
| 2014/0291886 A1* | 10/2014 | Mark | B29C 69/001 264/163 |
| 2015/0021832 A1* | 1/2015 | Yerazunis | B29C 64/106 264/443 |
| 2017/0129171 A1* | 5/2017 | Gardner | B33Y 50/02 |
| 2017/0210074 A1 | 7/2017 | Ueda et al. | |

FOREIGN PATENT DOCUMENTS

| | | | | |
|---|---|---|---|---|
| JP | 2002-500966 A | 1/2002 | | |
| JP | 2002-516346 A | 6/2002 | | |
| WO | 99/037454 A1 | 7/1999 | | |
| WO | 99/060507 A1 | 11/1999 | | |
| WO | WO-2014050303 A1 * | 4/2014 | ............... | C08K 9/04 |
| WO | 2014/153535 A2 | 9/2014 | | |
| WO | 2015/149054 A1 | 10/2015 | | |
| WO | 2015/182675 A1 | 12/2015 | | |

OTHER PUBLICATIONS

Office Action dated Nov. 4, 2019, in corresponding Chinese Patent Application No. 201780007409.8.
Extended European Search Report issued in corresponding European Application No. 17741355.6 dated Jul. 24, 2019 (7 pages).
International Preliminary Report on Patentability and Written Opinion issued in PCT/JP2017/001272 dated Jul. 24, 2018 and English Translation (12 pages).
Masahito Ueda et al., "Three-dimensional printing of a continuous fiber reinforced thermoplastic polymer by means of in-nozzle impregnation fused deposition modeling", Reinforced Plastics, vol. 61, No. 7, The Japan Reinforced Plastics Society, Jul. 2015.
Office Action issued in corresponding European Application No. 17741355.6 dated Oct. 14, 2021 (4 pages).

* cited by examiner

METHOD FOR MANUFACTURING THREE-DIMENSIONAL STRUCTURE

CROSS-REFERENCE TO RELATED APPLICATIONS

This application is a U.S. national phase application filed under 35 U.S.C. § 371 of International Application PCT/JP2017/001272, filed Jan. 16, 2017, designating the United States, which claims priority from Japanese Application Number 2016-010239, filed Jan. 22, 2016.

FIELD OF THE INVENTION

This invention relates to a method for manufacturing a three-dimensional structure, more specifically, relates to the method manufacturing by depositing a 3D printer filament including a thermoplastic resin using a 3D printer.

BACKGROUND OF THE INVENTION 3D printer is a sort of rapid prototyping machine (three-dimensional modeling machine) for manufacturing a three-dimensional structure (three-dimensional object) made of plastics or the like, making use of 3D data including CAD or CG data, created on computers, as design drawings.

The 3D printer is categorized by its deposition scheme. More specifically, one known category relates to 3D printers based on an ink jet UV curing system using a photocurable acrylic resin (for example, CONNEX and EDEN from Objet Geometries Ltd., and AGILISTA-3000 from Keyence Corporation). Other category relates to 3D printers based on fused deposition modeling using thermoplastic resins such as acrylonitrile-butadiene-styrene resin (ABS), polycarbonate resin (PC), polyphenylsulfone resin (PPSF) (for example, FORTUS Series, Dimension Series and uPrint Series from Stratasys Ltd., and Solidoodle 3 from Solidoodle). Still other category relates to SLS (Selective Laser Sintering) system or SLM (Selective Laser Melting) system, by which powdery materials such as resin powder, or metal power such as copper, bronze, titanium and nickel powders are irradiated by high-output laser beam to cause sintering and melting (for example, SLS Series from 3D Systems Inc., RaFaEl 550 from ASPECT Inc., and EOSINT Series from EOS GmbH).

The 3D printer creates a geometry using a resin (ink) which is a material for the three-dimensional structures. For example, the resin (ink) used in the fused deposition modeling system is thermoplastic resin shaped into filament, such as ABS resin filament. According to the fused deposition modeling system, the thermoplastic resin filament is melted and concurrently discharged from the 3D printer, and is then built up so as to form a desired geometry on a substrate. The fused deposition modeling system can easily create a desired geometry, since the molten resin is discharged in its molten state onto the substrate.

The three-dimensional structure has been output from the 3D printer in a wide range of fields primarily in manufacturing industries as well as in the fields of construction, medical science, education and frontier researches, in such a way that parts of a certain product are output on a reduced scale allowed for the 3D printer, in order to verify design and functions, prior to actual-scale production. The three-dimensional structure has, however, been used for more precise verification, or even expected to be output as actual resin built-up article.

Figure 5:
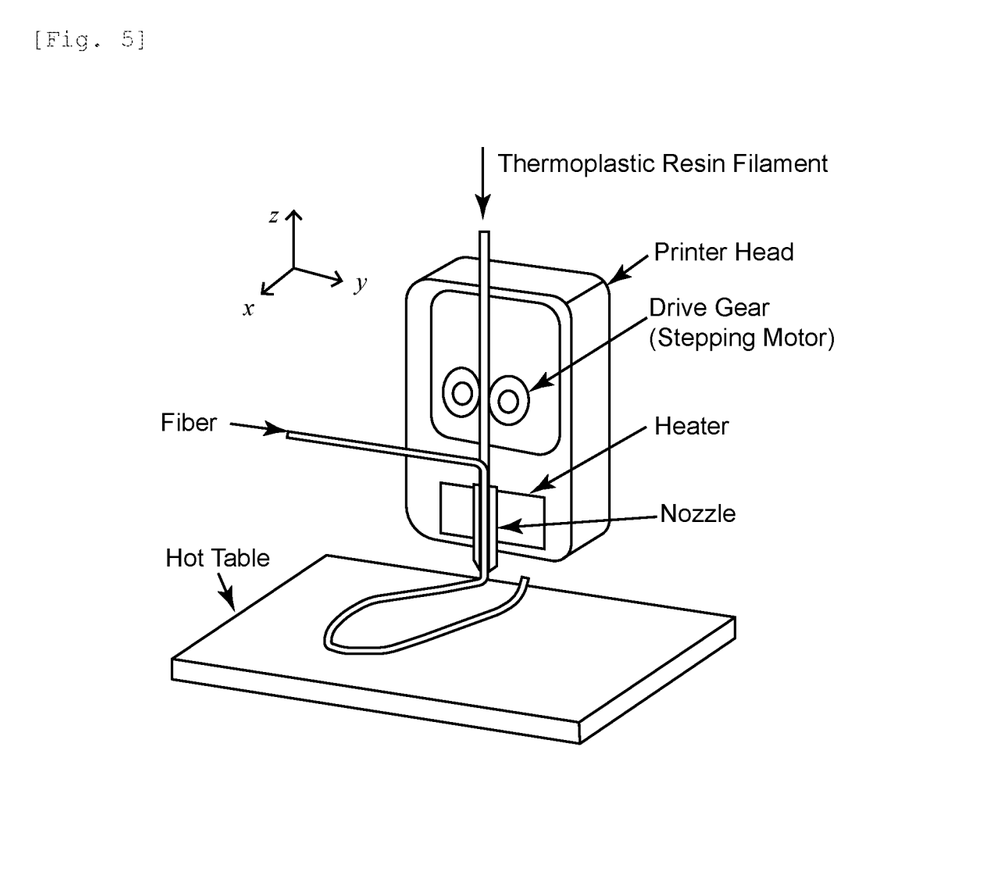
FIG. 5 is a schematic drawing illustrating a method for manufacturing a three-dimensional structure, using a conventional 3D printer.

Furthermore, it is discussed that manufacturing three-dimensional structure which composed of fiber blended thermoplastic resin by 3D printer in recent years. (See Non-Patent Literature 1). In Non-Patent Literature 1, FIG. 5 shows that the thermoplastic resin filament is sent out by drive gear.

CITATION LIST

Non Patent Literature

[Non-Patent Literature 1] *Reinforced Plastics*, Vol. 61, No. 7 (July, 2015)

SUMMARY OF THE INVENTION

Now, as described in Non-Patent Literature 1, the filament that contains the thermoplastic resin is discharged from the 3D printer, while being pushed using a drive gear or the like. Some of the filaments that contain the thermoplastic resin, however, too soft and flexible to be controlled suitably in the process of discharge with the drive gear. If the discharge is difficult to be controlled, it would also be difficult to manufacture the three-dimensional structure with high accuracy.

It is therefore an object of this invention to solve the problem, and is to provide a method for manufacturing a three-dimensional structure, capable of yielding a three-dimensional structure that excels in buildability.

In addressing the above-described problem, the present inventions found from our investigations that the problem can be solved by discharging the filament to manufacture a three-dimensional structure in a state in which one end of a filament containing a thermoplastic resin is bonded to a base with a force of 15N or larger.

Specifically, the above-described problem was found to be solved by <1>, and preferably by <2> to <11>.

<1> A method for manufacturing a three-dimensional structure, the method comprising melting a filament that contains a thermoplastic resin by using a 3D printer, and depositing it onto a base, and comprising bonding the filament at one end of the filament to a surface of the base so as to achieve a bond strength to the base of 15 N or larger, and discharging the filament through a nozzle of the 3D printer onto a surface of the base so as to deposit thereon, while moving at least one of the base or the nozzle, where, the bond strength is measured by cutting the base into a 40 mm-long×60 mm-wide rectangular piece; bonding a 60 mm-long filament to the cut base over a 20 mm-range in parallel with the lateral side of the cut base, so that the filament originates from a point on the cut base laterally 40 mm-away and longitudinally 20 mm-away from one apex of the cut base; bringing a point on the cut base laterally 20 mm-away and longitudinally 20 mm-away from the apex of the cut base, and a point on the filament longitudinally 40 mm-away from the originating point thereof, apart from each other in the direction parallel to the cut base plane at a tensile speed of 5 mm/second; then finding the force necessary for detaching the filament.

<2> The method for manufacturing a three-dimensional structure of <1>, wherein the filament contains a reinforcing fiber.

<3> The method for manufacturing a three-dimensional structure of <2>, wherein the reinforcing fiber is a continuous reinforcing fiber.

<4> The method for manufacturing a three-dimensional structure of <2> or <3>, wherein the reinforcing fiber is a carbon fiber or a glass fiber.

<5> The method for manufacturing a three-dimensional structure of any one of <1> to <4>, wherein the thermoplastic resin is a polyamide resin.
<6> The method for manufacturing a three-dimensional structure of any one of <1> to <4>, wherein the thermoplastic resin contains a structural unit derived from diamine and a structural unit derived from dicarboxylic acid, and 50 mol % or more of the structural unit derived from diamine is derived from xylylenediamine.
<7> The method for manufacturing a three-dimensional structure of any one of <1> to <6>, wherein the filament comprises a commingled yarn that contains a continuous reinforcing fiber and a continuous thermoplastic resin fiber.
<8> The method for manufacturing a three-dimensional structure of any one of <1> to <7>, wherein the base is a thermoplastic resin base.
<9> The method for manufacturing a three-dimensional structure of <8>, wherein the thermoplastic resin contained in the filament and the thermoplastic resin contained in the thermoplastic resin base belong to the same category.
<10> The method for manufacturing a three-dimensional structure of <8>, wherein both of the thermoplastic resin contained in the filament and the thermoplastic resin contained in the thermoplastic resin base are polyamide resins.
<11> The method for manufacturing a three-dimensional structure of any one of <8> to <10>, wherein the filament is bonded to the base by heat sealing.

According to this invention, it now become possible to manufacture a three-dimensional structure which excellent in buildability.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

The method for manufacturing a three-dimensional structure of this invention is characterized in that the method includes melting a filament that contains a thermoplastic resin in a 3D printer, and depositing it onto a base, and includes bonding the filament at one end thereof to the surface of the base so as to achieve a bond strength to the base of 15 N or larger, and discharging the filament through a nozzle of the 3D printer onto the surface of the base so as to depositing thereon, while moving at least one of the base or the nozzle.

With such design, the three-dimensional structure that excels in buildability may be manufactured.

In the method for manufacturing a three-dimensional structure, which includes melting a filament that contains a thermoplastic resin in a 3D printer and depositing it onto a base, it would be difficult to manufacture the three-dimensional structure with high accuracy, unless discharge of the filament is suitably controlled. Although the discharge of the filament might, in some cases, be suitably controlled with the aid of the drive gear of the 3D printer, the filament if too soft would curl inside the 3D printer. In particular, if the filament should curl inside the nozzle, the control with the aid of the drive gear would be substantially impossible. In contrast in this invention, the filament is bonded at one end thereof to the base. By bonding the base and the filament in this way, the filament can be introduced into the 3D printer under an appropriate tension applied by the base. The filament is therefore prevented from curling inside the nozzle or the like.

The manufacturing method of this invention will be detailed below referring to FIG. 1 to FIG. 3. This invention is, of course, not restrictively interpreted to these drawings.

Figure 1:
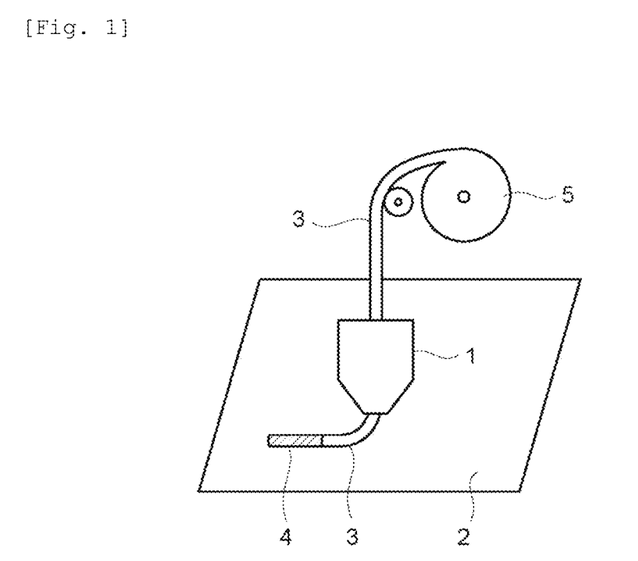
FIG. 1 is a schematic drawing illustrating a filament bonded to a base.

FIG. 1 is a schematic drawing illustrating a filament bonded to a base, wherein reference numeral 1 represents a nozzle, 2 represents the base, 3 represents the filament, 4 represents a point where the base and the filament are bonded, and 5 represents a take-up spool of the filament. As shown in the drawing, the filament 3 drawn out from the take-up spool 5 or the like is fed through the nozzle 1 and bonded onto the surface of the base 2.

In this invention, typically as illustrated in FIG. 1, one end of the filament is bonded to the base. Method for bonding the base and the filament is not specifically limited, and is exemplified by heat sealing; attachment using adhesive or tacky agent; and fixation using tape or fitting such as metal fitting. In this invention, the base if composed of a thermoplastic resin base is preferably heat sealed. Heat sealing temperature is not specifically limited, but may be determined based on the point of softening the thermoplastic resin contained in the filament, or of the thermoplastic resin base. When a crystalline thermoplastic resin, such as polyamide resin, is used for the filament, the heat sealing temperature preferably within the range from 5 to 50° C. higher than the melting point of the thermoplastic resin, which is more preferably within the range from 10 to 45° C. higher than the melting point of the thermoplastic resin, and even more preferably within the range from 20 to 40° C. higher than the melting point of the thermoplastic resin.

The bonding conceptually includes a mode of bonding aimed to intentionally achieve a bond strength of 15 N or larger; and a mode of bonding where such bond strength between the base and the filament is achieved as a result of some process given to the base or the filament.

Although FIG. 1 illustrates the mode where the endmost part of the filament is bonded, it is not always necessary to bond the endmost part of the filament. This invention also encompasses the mode of bonding the filament at a near-end part, while leaving some margin beyond that part.

The base may be a stage of the 3D printer, or a film placed on the stage of the 3D printer, on which the structure may be built. The base will be detailed later.

The bond strength in this invention is measured by cutting the base into a 40 mm-long×60 mm-wide rectangular piece; bonding a 60 mm-long filament to the base over a 20 mm-range in parallel with the lateral side of the cut base, so that the filament originates from a point on the cut base laterally 40 mm-away and longitudinally 20 mm-away from one apex of the cut base; bringing a point on the cut base laterally 20 mm-away and longitudinally 20 mm-away from the apex of the cut base, and a point on the filament longitudinally 40 mm-away from the originating point thereof, apart from each other in the direction parallel to the cut base plane at a tensile speed of 5 mm/second; and finding the force necessary for detaching the filament. The measurement should follow a method detailed later in EXAMPLES. If the instrument described later in EXAMPLES were no more available due to discontinuation or for other reason, other instrument with equivalent performances will suffice. The same will apply to methods of measurement.

The bond strength, defined above as 15 N or larger, is preferably 20 N or larger, more preferably 25 N or larger, even more preferably 30 N or larger, and yet more preferably 33 N or larger. Within these ranges, the obtainable three-dimensional structure will tend to have improved buildability. The upper limit value of the bond strength is not specifically limited, but may be determined depending on applications, which is typically 100 N or smaller, 80 N or smaller, 65 N or smaller, or 50 N or smaller. With the bond strength controlled to 100 N or smaller, the base will become recyclable, and also the buildability will tend to improve.

After one end of the filament is bonded, the filament 3 is then built up on the surface 2 of the base. FIG. 2 and FIG. 3 are schematic drawings illustrating processes for bonding the filament onto the surface of the base, after the filament was bonded to the surface of the base, seen from different angles. FIG. 2 and FIG. 3 use reference numerals same as those in FIG. 1, and reference numeral 6 represents the three-dimensional structure.

When the filament is discharged, the base may be moved for depositing to obtain a desired geometry, the nozzle may be moved for depositing, or both of the base and the nozzle may be moved for depositing. From the viewpoint of improving the productivity, it is preferable to move the nozzle for the depositing.

Distance between the tip of the nozzle 1 and the base 2 may be short (3 mm or below, for example), or may be long (over 5 mm, for example). Shorter distance can more effectively improve the followability of the filament.

Discharge speed may typically, but not restrictively, be set to 1 to 100 mm/second, and may further be 1 to 20 mm/second.

The thermoplastic resin contained in the filament is allowed to melt at least in one step before discharge, during discharge, or after discharge. Now "melting" means that at least a part of the thermoplastic resin contained in the filament melts, preferably means that 80% by weight or more of the thermoplastic resin melts, more preferably means that 95% by weight or more thereof melts, and even more preferably means that 99% by eight or more thereof melts. The melting temperature is not specifically limited so far as the thermoplastic resin can melt at that temperature. When the thermoplastic resin is a crystalline thermoplastic resin, the melting temperature is preferably 10° C. or more higher than the melting point of the thermoplastic resin, more preferably 15 to 60° C. higher than the melting point of the thermoplastic resin, and even more preferably 20 to 40° C. higher than the melting point of the thermoplastic resin.

In this invention, the filament is preferably melted by heating the inside of the nozzle, when the filament is discharged.

In the alternative, the filament is preferably melted by laser irradiation in the case of melting after being discharged from the nozzle.

Figure 2:
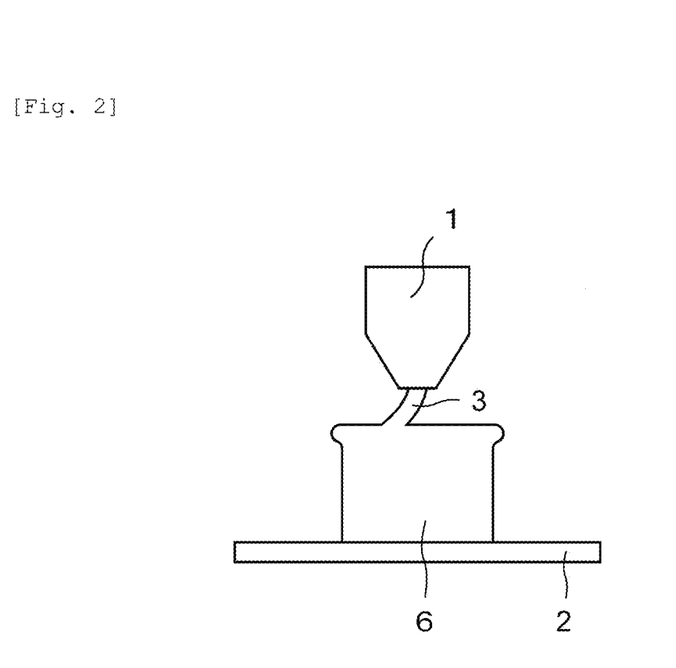
FIG. 2 is a schematic drawing illustrating a process for manufacturing the three-dimensional structure of this invention.
Figure 3:
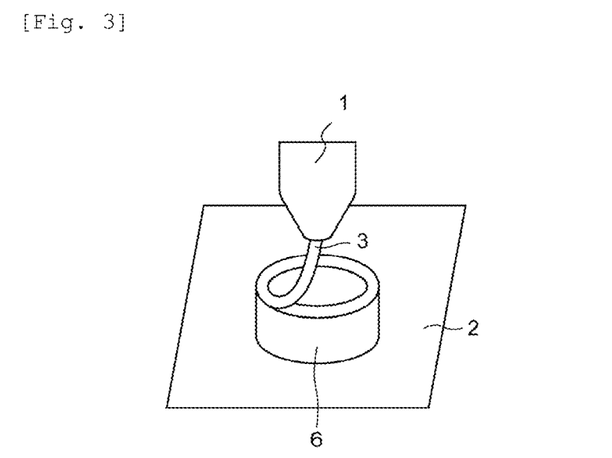
FIG. 3 is a schematic drawing illustrating a process for manufacturing the three-dimensional structure of this invention.

Referring now back to FIG. 2, the dimensional structure 6 in the process of building would warp, since the thermoplastic resin is not yet completely solidified. Hence when the three-dimensional structure is manufactured, it is also preferable to heat the stage 2. The heating temperature of the stage is typically 50 to 100° C., also may be 55 to 90° C.

The heating temperature of the stage is preferably lower than 15 to 300° C. of heat-sealing temperature of the filament and the stage, more preferably 15 to 150° C., even more preferably 30 to 100° C. In the case of the filament containing crystalline thermoplastic resin, it is preferably lower than 15 to 300° C. of the melting point of the thermoplastic resin, more preferably 15 to 150° C., even more preferably 30 to 100° C.

Also an embodiment without heating the stage is of course within the scope of this invention.

As the 3D printer used in this invention, those applicable to fused deposition modeling system and those applicable to the SLM method are preferably used. Commercially available 3D printers based on the fused deposition modeling system are exemplified by FORTUS Series, Dimension Series and uPrint Series from Stratasys Ltd.; and Solidoodle 3 from Solidoodle. Commercially available 3D printers based on the SLM system are exemplified by SLS Series from 3D Systems, Inc.; RaFaEl 550 from ASPECT, Inc.; and EOSINT Series from EOS GmbH.

The three-dimensional structure 6 may be manufactured by using a supporting member that supports a space part of the three-dimensional structure 6. When the supporting member is used, the filament is discharged onto the surface of the supporting member. Acryl resin is typically used as the supporting member.

The geometry of the three-dimensional structure obtainable in this invention may have the thinnest part of 5 mm thick or below, which may even be 3 mm thick or below, although not specifically limited. The lower limit value of the thickness of the thinnest part may be, but not limitatively, 0.5 mm or above.

The three-dimensional structure obtained in this embodiment may widely be used for articles made of fiber-reinforced resin. Applicable fields include automobile and other transport equipment parts, general machinery parts, precision equipment parts, electronic/electric equipment parts, office automation equipment parts, building material/housing equipment parts, medical device, leisure time/sport goods, playing tools, medical supplies, daily goods including food wrapping film, and defense/aerospace products, but not specifically limited thereto. It is also suitably applicable to prototypes of these products.

Next, the filament used in this invention will be detailed.

The filament used in this invention contains the thermoplastic resin. With the thermoplastic resin contained therein, it now becomes possible to melt and deposit the thermoplastic resin, as described above.

As a first embodiment of the filament, exemplified is a filament composed of a continuous thermoplastic resin fiber.

The continuous thermoplastic resin fiber refers to a thermoplastic resin having a length exceeding 6 mm, and preferably refers to a thermoplastic resin fiber having a length exceeding 30 mm. The continuous thermoplastic resin fiber used in this invention preferably, but not restrictively, has a number-average fiber length of 1 to 20,000 m from the viewpoint of improving buildability, which is more preferably 100 to 10,000 m, and even more preferably 1,000 to 7,000 m.

The filament composed of such continuous thermoplastic resin fiber is preferably a fiber made from a thermoplastic resin composition that contains a single type, or two or more types of thermoplastic resins as major ingredients. The major ingredient means that the thermoplastic resin typically accounts for 80% by weight or more of the thermoplastic resin composition, and further accounts for 90 to 100% by weight. The thermoplastic resin will be detailed later.

The continuous thermoplastic resin fiber may be a monofilament or a multifilament. The monofilament is preferable. When given as the multifilament, it preferably has the number of fibers of 16 to 540 f, and more preferably 24 to 108 f. When the multifilament is used, a treatment agent may be used to gather the continuous thermoplastic resin fibers into a bundle.

The continuous thermoplastic resin fiber used in this invention may also have the surface thereof treated with a treatment agent.

As a second embodiment of the filament, exemplified is a filament that contains a reinforcing fiber. With the reinforcing fiber contained therein, the filament will have improved strength, and will be made less breakable during discharge. Making the filament less breakable successfully increases the discharge speed, and improves the productivity. With the reinforcing fiber contained therein, the filament will also be advantageous in that it is allowed for a wider variety of geometries that can be built up without using supporting member.

The reinforcing fiber may be a short fiber, or may be a continuous reinforcing fiber.

When the staple is employed, it is preferable to knead, in a molten state, a composition that contains the thermoplastic resin, the staple, and optionally-added various additives, and to form the composition into filaments. Ratio of content of the staple in the composition is preferably 10 to 70% by weight, and more preferably 30 to 70% by weight.

The filament that contains the continuous reinforcing fiber is exemplified by filament that contains a powdery resin and the continuous reinforcing fiber; core-sheath type filament composed of the continuous thermoplastic resin fiber and the continuous reinforcing fiber; braid or twisted cord composed of the continuous thermoplastic resin fiber and the continuous reinforcing fiber; fiber processed product such as knitted fabric and edge rolled fabric; covered type prepreg; prepreg containing the thermoplastic resin and the continuous reinforcing fiber; blended yarn that contains the continuous thermoplastic resin fiber and the continuous reinforcing fiber; interlaced yarn that contains the continuous thermoplastic resin fiber and the continuous reinforcing fiber; and commingled yarn of the continuous thermoplastic resin fiber and the continuous reinforcing fiber.

Modes of embodiment of using the commingled yarn include a mode in which the commingled yarn is used without modification; a mode in which the commingled yarn is made into braid or twisted cord; and a mode in which other continuous thermoplastic resin fiber is used besides the continuous thermoplastic resin fiber that composes the commingled yarn, and the commingled yarn is applied (by heat-sealing, adhesive bonding, etc.) to at least a part of such other continuous thermoplastic resin fiber. This invention is particularly beneficial in that the three-dimensional structure may be built up using the filament which is substantially composed of the commingled yarn only. In other words, by using a flexible commingled yarn, it will become easier to manufacture the three-dimensional structure with a more precise structure. Now, "substantially" means that any material, other than the materials that compose the commingled yarn, such as the continuous thermoplastic resin fiber, the continuous reinforcing fiber and the treatment agent, is not intentionally used; and typically means that the materials composing the commingled yarn account for 95% by weight or more of the filament, and further 99% by weight or more of the filament.

The filament used in this invention may have an elastic modulus of smaller than 10 MPa. The elastic modulus in this context means the value measured by embedding an end of a 15 mm-long filament up to 10 mm depth in a resin to form a 25 mm-diameter cylinder; by inserting the cylindrical resin part directed downward into a 25 mm-diameter, 20 mm-high cylindrical hole of a jig; by fitting a 25 mm-diameter disk-like weight from above the cylindrical resin part into the jig; and thereby applying load at a testing speed of 0.2 mm/min. The loading range may appropriately be determined by those skilled in the art, depending on expected levels of the elastic modulus. In this invention, the loading range is exemplified by 50 N, 100 N and 1 kN.

The filament in this invention may have a circular cross section, or non-circular cross section. Hence, also UD tape and non-woven fabric are suitably used as the filament.

The filament in this invention preferably contains substantially no resin-based adhesive. As a result of the substantial absence of adhesive, in the process of building up, the filament may more effectively be suppressed from unintentionally adhering onto inappropriate part. Now "contains substantially no . . . " means that the adhesive preferably accounts for 5% by weight or less of the resin component contained in the filament in this invention, which is more preferably 1% by weight or less, and even more preferably 0.5% by weight or less.

The diameter of the 3D printer filament may suitably be determined, depending on applications or nozzles to be used, and may preferably be 0.5 mm or above at lowest, more preferably 0.7 mm or above, and may even be 1.1 mm or above. The filament diameter is preferably 3.0 mm or below at highest, more preferably 2.5 mm or below, and may even be 2.0 mm or below.

Hereinafter, the materials used for the filament will be explained.

<Thermoplastic Resin>

The thermoplastic resin used for the filament in this invention has a wide range of choice. Employable thermoplastic resins include polyolefin resins such as polyethylene and polypropylene; polyamide resin; polyester resins such as polyethylene terephthalate, polybutylene terephthalate, and polylactic acid; polycarbonate resin; polystyrene resins such as acrylonitrile-butadiene-styrene resin (ABS resin); polyoxymethylene resin; polyetherketone; polyethersulfone; polyphenylsulfone resin; and thermoplastic polyetherimide. Polyamide resin is preferable. Details of the thermoplastic resin composition and polyamide resin, used in this invention, will be detailed later.

In the case of the thermoplastic resin is the crystalline thermoplastic resin, although depending on types of resin to be used, its melting point is preferably 165 to 390° C., which is more preferably 165 to 375° C., even more preferably 165 to 305° C., yet more preferably 175 to 295° C., and furthermore preferably 185 to 285° C.

For the case where the thermoplastic resin employs a high-melting-point resin, a possible choice is highly heat resistant thermoplastic resin known as super engineering plastics. Examples of the super engineering plastics include AURUM (registered trademark) from Mitsui Chemicals, Inc., and Victrex (registered trademark) PEEK Series from Victrex plc.

The thermoplastic resin may be given by single component, or two or more components.

When given by two or more components of thermoplastic resin, the melting point of the thermoplastic resin is the melting point of the thermoplastic resin having the lowest of all. For the case where the thermoplastic resin has two or more melting points, the lowest melting point is defined as the melting point of the thermoplastic resin.

<<Polyamide Resin>>

The polyamide resin used in this invention is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyxylylene adipamide, polyxylylene sebacamide, polyxylylene dodecamide, polyamide 9T, polyamide 9MT, and polyamide 6I/6T.

Among these polyamide resins, considering the buildability and heat resistance, the polyamide resin preferably contains a structural unit derived from diamine and a structural unit derived from dicarboxylic acid, wherein xylylenediamine-derived polyamide resin (occasionally referred to as "XD-based polyamide", hereinafter) preferably accounts for 50 mol % or more of the structural unit derived from diamine. Use of low hygroscopic polyamide, such as XD-based polyamide, polyamide 11 or polyamide 12, will more effectively suppress bubbling in the obtainable three-dimensional structure.

When the polyamide resin is a mixture, the ratio of XD-based polyamide in the polyamide resin is preferably 50% by weight or more, and more preferably 80% by weight or more.

The XD-based polyamide is preferably such that 70 mol % or more, more preferably 80 mol % or more, even more preferably 90 mol %, and particularly preferably 95 mol % or more of the structural unit derived from diamine is derived from metaxylylenediamine and/or paraxylylenediamine, and such that preferably 50 mol % or more, more preferably 70 mol % or more, even more preferably 80 mol % or more, yet more preferably 90 mol % or more, and furthermore preferably 95 mol % or more of the structural unit derived from dicarboxylic acid is derived from straight-chain aliphatic α,ω-dicarboxylic acid preferably having 4 to 20 carbon atoms.

Diamines employable as the starting diamine component of the XD-based polyamide, but other than metaxylylenediamine and paraxylylenediamine, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic diamines such as bis(4-aminophenyl)ether, paraphenylenediamine, and bis(aminomethyl)naphthalene, among which every single compound may be used independently, or two or more compounds may be combined for use.

When diamines other than xylylenediamine is used as the diamine component, such diamine preferably accounts for less than 50 mol %, preferably 30 mol % or less, more preferably 1 to 25 mol %, and particularly preferably 5 to 20 mol %.

The straight-chain aliphatic α,ω-dicarboxylic acid having 4 to 20 carbon atoms, suitably used as the starting dicarboxylic acid component of the polyamide resin, is exemplified by aliphatic dicarboxylic acids such as succinic acid, glutaric acid, pimelic acid, suberic acid, azelaic acid, adipic acid, sebacic acid, undecanedioic acid, and dodecanedioic acid, which may be used independently, or may be used as a mixture of two or more compounds. Among them, adipic acid or sebacic acid is preferable since the polyamide resin will have the melting point suitable for building-up. Sebacic acid is more preferable.

Examples of the dicarboxylic acid component, other than the straight-chain aliphatic α,ω-dicarboxylic acid having 4 to 20 carbon atoms, include phthalic acid compounds such as isophthalic acid, terephthalic acid, and orthophthalic acid; and naphthalenedicarboxylic acid available in isomers including 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. Every single compound may be used independently, or two or more compounds may be combined for use.

When the dicarboxylic acid, other than the straight-chain aliphatic α,ω-dicarboxylic acid having 4 to 20 carbon atoms, is used as the dicarboxylic acid component, it is preferable to use terephthalic acid or isophthalic acid from the viewpoint of buildability and barrier performance. Ratio of terephthalic acid or isophthalic acid in the structural unit derived from dicarboxylic acid is 30 mol % or less, more preferably 1 to 30 mol %, and particularly 5 to 20 mol %.

Furthermore, as the components for composing the polyamide resin, besides the diamine component and the dicarboxylic acid component, employable as copolymerizable component are lactams such as ε-caprolactam and laurolactam; and aliphatic aminocarboxylic acid such as aminocaproic acid and aminoundecanoic acid, so far as they will not adversely affect the effects of this invention.

The polyamide resin used in this invention preferably has a number-average molecular weight (Mn) of 6,000 to 30,000, which is more preferably 8,000 to 28,000, even more preferably 9,000 to 26,000, yet more preferably 10,000 to 24,000, and particularly preferably 11,000 to 22,000. Within these ranges, the heat resistance, elastic modulus, dimensional stability, and buildability may further be improved.

The number-average molecular weight (Mn) in this context is given by the equation below, using the terminal amino group concentration [NH$_2$] (µeq/g) and terminal carboxy group concentration [COOH] (µeq/g) of the polyamide resin.

$$\text{Number-average molecular weight}(Mn)=2,000,000/([COOH]+[NH_2])$$

The polyamide resin used in this invention preferably has a polydispersity (weight-average molecular weight/number-average molecular weight (Mw/Mn)) of 1.8 to 3.1. The polydispersity is more preferably 1.9 to 3.0, and even more preferably 2.0 to 2.9. With the polydispersity controlled within these ranges, it will become more easy to obtain the three-dimensional structure that excels in mechanical properties.

The polydispersity of polyamide resin is controllable, typically by suitably selecting types and amounts of initiator or catalyst used for polymerization, and polymerization conditions including reaction temperature, pressure and temporal duration. Alternatively, it is also controllable by mixing two or more types of polyamide resins obtained under different conditions and have different average molecular weights, or by subjecting the polyamide resin after being polymerized to fractional precipitation.

The polydispersity may be determined by GPC as a standard polymethyl metacrylate equivalent value, specifically by using "HLC-8320GPC" from Tosoh Corporation as equipment, two units of "TSKgel Super HM-H" from Tosoh Corporation as columns, a 10 mmol/l sodium trifluoroacetate solution in hexafluoroisopropanol (HFIP) as an eluant, at a resin concentration of 0.02% by weight, column temperature of 40° C., flow rate of 0.3 ml/min, and using refractive index detector (RI). An analytical curve is prepared by dissolving six levels of concentration of PMMA into HFIP and by measuring the values.

In this invention, the polyamide resin preferably has a melting point of 150 to 310° C., which is more preferably 180 to 300° C., and even more preferably 180 to 250° C.

The polyamide resin also preferably has a glass transition point of 50 to 100° C., which is more preferably 55 to 100° C., and particularly 60 to 100° C. Within these ranges, the heat resistance will tend to improve.

Now, the melting point in this invention is defined by peak-top temperature at which an endothermic peak observed in DSC (differential scanning calorimetry).

The measurement employs a DSC apparatus, approximately 1 mg of sample, nitrogen gas as an atmospheric gas at a flow rate of 30 ml/min, and a heating rate of 10° C./min. The sample is heated from room temperature up to a predicted melting point or above, and the melting point may be determined from peak-top temperature of the endothermic peak in the process of melting. Next, the molten polyamide resin is rapidly cooled on dry ice, and again heated at a heating rate of 10° C./min up to the melting point or above, to determine the glass transition point and the melting point. The DSC apparatus employable here is DSC-60 from Shimadzu Corporation, for example.

<Thermoplastic Resin Composition>

In this invention, the continuous thermoplastic resin fiber used for the filament, or, the continuous thermoplastic resin fiber used for the commingled yarn of the filament, is preferably composed of the thermoplastic resin composition that contains the thermoplastic resin as the major ingredient, and more preferably composed of a polyamide resin composition that contains a polyamide resin as the major ingredient.

The thermoplastic resin composition used in this invention may contain an elastomer component in addition to the thermoplastic resin component.

The elastomer component employable here include known elastomers such as polyolefin-based elastomer, diene-based elastomer, polystylene-based elastomer, polyamide-based elastomer, polyester-based elastomer, polyurethane-based elastomer, fluorine-containing elastomer, and silicone-based elastomer, and is preferably polyolefin-based elastomer and polystylene-based elastomer. For the purpose of improving the compatibility with the polyamide resin, also preferably used are elastomers which are modified using $\alpha,\beta$-unsaturated carboxylic acid and anhydride thereof, or acrylamide and derivatives thereof, in the presence or absence of a radical initiator.

The amount of consumption of the elastomer component, when blended to the thermoplastic resin composition, is preferably 5 to 25% by weight of the thermoplastic resin composition.

To the thermoplastic resin composition used in this invention, it is permissible to add additives such as antioxidant, heat stabilizer and other stabilizers, hydrolysis resistance modifier, weathering stabilizer, matting agent, UV absorber, nucleating agent, plasticizer, dispersion aid, flame retardant, antistatic agent, anticoloring agent, antigelling agent, colorant, and mold releasing agent, so long as the purpose and effects of this invention will not adversely be affected. As for details on the additives, the description in paragraphs [0130] to [0155] of JP-B1-4894982 may be referred to, the contents of which are incorporated by reference into this specification. The thermoplastic resin composition used in this invention may also contain a filler, but preferably does not contain the filler. More specifically, this means that the filler content in the thermoplastic resin composition is 3% by weight or less.

One preferred embodiment of the thermoplastic resin composition used in this invention is such that polyamide resin accounts for 70% by weight or more (preferably 80% by weight or more, and more preferably 90% by weight or more) of the thermoplastic resin composition.

<Reinforcing Fiber>

Reinforcing fiber used for the filament may be staple or continuous reinforcing fiber, as described above.

The reinforcing fiber used in this invention is exemplified by inorganic fibers such as glass fiber, carbon fiber, alumina fiber, boron fiber, ceramic fiber, and metal fiber (steel fiber, etc.); and organic fibers such as botanical fiber (Kenaf, bamboo fiber, etc.), aramid fiber, polyoxymethylene fiber, aromatic polyamide fiber, polyparaphenylene benzobisoxazole fiber, and ultra-high molecular weight polyethylene fiber. Among them, preferable is at least one fiber selected from carbon fiber, aramid fiber and glass fiber, and more preferably at least one of carbon fiber or glass fiber. In particular, carbon fiber is more preferably used for its excellent properties including light weight, high strength and large elastic modulus. As the carbon fiber, preferably used are polyacrylonitrile-based carbon fiber and pitch-based carbon fiber. Also carbon fibers derived from botanical raw materials, such as lignin and cellulose, may be used.

The staple employable here is a product obtained by cutting or chopping the continuous reinforcing fiber. Specific examples include "chopped strand" of 1 to 10 mm long, and "milled fiber" having a weight-average fiber length of 10 to 500 μm.

The continuous reinforcing fiber is defined to be a continuous reinforcing fiber longer than 10 mm in number-average fiber length, and is preferably a continuous reinforcing fiber longer than 30 mm in number-average fiber length. Although not specifically limited, the continuous reinforcing fiber used in this invention preferably has a number-average fiber length of 1 to 20,000 m from the viewpoint of good buildability, which is more preferably 100 to 10,000 m, and even more preferably 1,000 to 7,000 m.

One example of the continuous reinforcing fiber used in this invention relates to a continuous reinforcing fiber bundle in which a plurality of continuous reinforcing fibers are gathered into an bundle. In this embodiment, the continuous reinforcing fiber preferably has a fiber length of 1 m or longer in number-average fiber length.

Another example of the continuous reinforcing fiber used in this invention relates to a continuous reinforcing fiber of 30 to 150 mm long in number-average fiber length. Such continuous reinforcing fiber is exemplified by "stretch-broken carbon fiber".

The continuous reinforcing fiber contained in the filament used in this invention is preferably being treated with a treatment agent. Such treatment agent is exemplified by sizing agent and surface treatment agent, preferably by those described in paragraphs [0093] and [0094] of JP-B1-4894982, the contents of which are incorporated by reference into this specification.

More specifically, the treatment agent used in this invention is preferably at least one selected from epoxy resin, urethane resin, silane based compound, isocyanate compound, titanate based compound, and polyamide resin; preferably at least selected from epoxy resin, urethane resin, silane coupling agent, water-insoluble polyamide resin and water-soluble polyamide resin; more preferably at least one selected from epoxy resin, urethane resin, water-insoluble polyamide resin and water-soluble polyamide resin; and even more preferably water-soluble polyamide resin.

The amount of consumption of the treatment agent is preferably 0.001 to 1.5% by weight of the reinforcing fiber, which is more preferably 0.1 to 1.2% by weight, and even more preferably 0.5 to 1.1% by weight.

The continuous reinforcing fiber may be treated with the treatment agent by any of known methods. According to one exemplary method, the continuous reinforcing fiber may be added to a solution having a treatment agent dissolved therein, so as to allow the treatment agent to adhere onto the surface of the continuous reinforcing fiber. Alternatively, the treatment agent may be air-blown onto the surface of the continuous reinforcing fiber. Still alternatively, the continuous reinforcing fiber preliminarily treated with surface treatment agent or other treatment agent may be used, or, the commercial product may be once cleaned off the surface treatment agent or other treatment agent, and may be surface-treated again so as to adjust the amount of treatment agent to a desired value.

<Commingled Yarn>

The commingled yarn used in this invention contains the continuous reinforcing fiber and the continuous thermoplastic resin fiber, wherein the continuous reinforcing fiber is dispersed in the continuous thermoplastic resin fiber, and, a part of, or the entire portion of the continuous thermoplastic resin fiber remain in the fiber form, rather than being impregnated into the continuous reinforcing fiber. As described in Non-Patent Literature 1, when continuous reinforced fiber and continuous thermoplastic resin fiber are fed separately, the thermoplastic resin filament was found to be less infiltrative into the fiber, unless otherwise pressurized during or after the discharge, or unless otherwise impregnated over a sufficient temporal duration. But, by using the commingled yarn, it is now possible to impregnate without pressurizing or temporal duration. Furthermore, it also becomes possible to suppress voids inside of obtained three-dimensional structure more effectively.

The dispersity of the continuous reinforcing fiber in the commingled yarn is preferably 60 to 100%, more preferably 60 to 99%, even more preferably 63 to 99%, and yet more preferably 68 to 99%. Within these ranges, the continuous thermoplastic resin fiber and continuous reinforcing resin fiber will be more likely to impregnate into the commingled yarn, and thereby the obtainable three-dimensional structure will have a lesser amount of voids. The dispersity is measured in a method described below.

The commingled yarn was cut, embedded in an epoxy resin, a cross section of the embedded commingled yarn taken normal to the longitudinal direction was polished, and the cross section was photographed under an ultra-deep color 3D shape measurement microscope VK-9500 (controller unit)/VK-9510 (measurement unit) (from Keyence Corporation). On the photographed image of the cross section, six additional lines were radially drawn at equiangular intervals on an obtained image, and the lengths of regions of the individual continuous reinforcing fiber that fall on each additional line were measured to be a1, a2, a3 . . . ai (i=n). The lengths of regions of the individual continuous thermoplastic resin fiber that fall on each additional line were concurrently measured to be b1, b2, b3 . . . bi (i=m). The dispersity of the continuous reinforcing fiber was determined by the equation below:

[Mathematical Formula 1]
$$\left[1 - \left(\frac{1}{n \text{ or } m} \times \frac{\sum_{i=1}^{norm}(a_i \text{ or } b_i)}{\sum_{i=1}^{norm}(a_i) + \sum_{i=1}^{norm}(b_i)}\right)\right] \times 100 \ (\%)$$

The impregnation rate of the continuous thermoplastic resin fiber in the commingled yarn, is typically determined appropriately in the range of 80% to 0%. In the commingled yarn of this invention, the degree of impregnation may be significantly large, or may be significantly small. A large impregnation rate of the commingled yarn may shorten the manufacturing time of the three-dimensional structure, and may improve the productivity. Meanwhile, a small impregnation rate of the commingled yarn makes it highly flexible, therefore makes the reinforcing fiber less likely to break, and thereby good operability and good physical properties of the built-up article are suitably balanced.

The impregnation rate is measured in a method described below.

The commingled yarn was cut, embedded in an epoxy resin, a cross section of the embedded commingled yarn taken normal to the longitudinal direction was polished, and the cross section was photographed under an ultra-deep color 3D shape measurement microscope VK-9500 (controller unit)/VK-9510 (measurement unit) (from Keyence Corporation). On the thus obtained cross-sectional image, regions in the continuous reinforcing fiber partially melted and impregnated with a component derived from the continuous thermoplastic resin fiber were selected using image analyzing software ImageJ, and the area was measured. The impregnation rate was given by [Area of region in continuous reinforcing fiber impregnated with component derived from continuous thermoplastic resin fiber]/[Area of photographed cross section] (in %).

In the commingled yarn used in this invention, the continuous reinforcing fiber or the continuous thermoplastic resin fiber accounts for 95% by weight or more of the continuous reinforcing fiber that composes the commingled yarn.

The commingled yarn used in this invention preferably is an article in which the continuous reinforcing fiber and the continuous thermoplastic resin fiber are bundled with the aid of at least one of treatment agents used for the continuous reinforcing fiber and the continuous thermoplastic resin fiber.

Ratio of the continuous reinforcing fiber in the commingled yarn is preferably 10% by weight or above, more preferably 15% by weight or above, even more preferably 20% by weight or above, yet more preferably 30% by weight or above, furthermore preferably 40% by weight or above, particularly preferably 50% by weight or above, and may even be 55% by weight or above. The upper limit of the ratio of the continuous reinforcing fiber in the commingled yarn is preferably 90% by weight or below, more preferably 80% by weight or below, even more preferably 70% by weight or below, and may even be 65% by weight or below.

The ratio of the continuous thermoplastic resin fiber in the commingled yarn is preferably 10% by weight or above, more preferably 20% by weight or above, even more preferably 30% by weight or above, and may be 35% by weight or above. The upper limit of the ratio of the continuous thermoplastic resin fiber is preferably 90% by weight or below, more preferably 85% by weight or below, even more preferably 80% by weight or below, yet more preferably 70% by weight or below, furthermore preferably 60% by weight or below, particularly preferably 50% by weight or below, and may even be 45% by weight or below.

The commingled yarn is manufactured in most cases by using continuous thermoplastic resin fiber bundle and the continuous reinforcing fiber bundle. Total fineness of fibers used for manufacturing a single commingled yarn (the sum of the total fineness of the continuous thermoplastic resin fiber and the total fineness of the continuous reinforcing fiber, both used for manufacturing a single commingled yarn, that is, the fineness of commingled yarn) is preferably 1,000 to 100,000 dtex, more preferably 1,500 to 50,000 dtex, even more preferably 2,000 to 50,000 dtex, and particularly preferably 3,000 to 30,000 dtex.

The total number of fibers used for manufacturing a single commingled yarn (the sum of the total number of fibers of continuous thermoplastic resin fiber and the total number of fibers of continuous reinforcing fiber) is preferably 100 to 100,000 f, more preferably 1,000 to 100,000 f, even more preferably 1,500 to 70,000 f, and yet more preferably 2,000 to 20,000 f. Within these ranges, the commingled yarn will have improved commingling performance, and thereby the obtainable three-dimensional structure will have improved physical properties and texture. It will also have less region in which either fiber unevenly disperses, instead allowing both fibers to disperse into each other more easily.

The commingled yarn used in this invention may be twisted. Method for twisting is selectable from any known methods without special limitation. Number or turns of twisting is suitably determined depending on types of the thermoplastic resin b used for the continuous thermoplastic resin fiber; number of fibers and fineness of the thermoplastic resin fiber bundle; types, number of fibers and fineness of the continuous reinforcing fiber; and ratio of numbers of fibers, or the ratio of fineness values of the continuous thermoplastic resin fiber and the continuous reinforcing fiber, which may typically be 1 to 200 turns/m (fiber length), may even be 1 to 100 turns/m, may further be 1 to 70 turns/m, and may particularly be 1 to 50 turns/m. With such design, the obtainable three-dimensional structure will have improved mechanical strength.

The continuous reinforcing fiber and/or the continuous thermoplastic resin fiber, used for the commingled yarn, are preferably surface-treated as described above by treatment agent. With such design, the obtainable commingled yarn will have the continuous reinforcing fiber and the continuous thermoplastic resin fiber more uniformly dispersed therein, and, the impregnation rate of the continuous thermoplastic resin fiber into the continuous reinforcing fiber will further be improved. The treatment agent which may be employed may be the same as those for the continuous reinforcing fiber or continuous thermoplastic resin described previously.

In addition, the commingled yarn may contain any components other than the continuous reinforcing fiber, the continuous thermoplastic resin fiber, treatment agent for the continuous reinforcing fiber, and the treatment agent for the continuous thermoplastic resin fiber. Specific examples include carbon fiber staple, carbon nanotube, fullerene, micro-cellulosic fiber, talc and mica. Amount of addition of such other components is preferably 5% by weight or less of the commingled yarn As one example of the commingled yarn of this invention, exemplified is a commingled yarn that includes the continuous reinforcing fiber and the continuous thermoplastic resin fiber, wherein the dispersity of the continuous reinforcing fiber in the commingled yarn is 60 to 100%, the continuous thermoplastic resin fiber does not substantially impregnate in the continuous reinforcing fiber, and the continuous thermoplastic resin fiber is longer than 30 mm.

As the commingled yarn used in this invention, also preferably used is a commingled yarn in which the continuous reinforcing fiber of approximately 20 to 30 mm long is dispersed in the thermoplastic resin fiber, and kept in shape with the thermoplastic resin fiber. The thermoplastic resin fiber that takes part in keeping the shape is preferably defined by the same ranges as the continuous thermoplastic resin fiber. For keeping of the shape, a dispersion of the continuous reinforcing fiber of approximately 20 to 30 mm long, in the thermoplastic resin fiber, is preferably wound up by the thermoplastic resin fiber.

Next, the base used in this invention will be explained.

The base used in this invention is not specifically limited so far as the filament can be built up thereon.

The base may be the stage per se of the 3D printer as described above, or may be provided on the stage of the 3D printer. The base may be a film or sheet, or alternatively a molded article or part. Materials for composing the base are exemplified by resin, metal, glass, inorganic substances, and combinations of them. Resin is preferable, and thermoplastic resin is more preferable. Preferred thermoplastic resin is the same as the thermoplastic resin used for the aforementioned filament.

The base may have a treated surface for improved adhesiveness with the filament.

The thickness of the base is typically, but not restrictively, 10 μm to 1 mm, preferably 30 μm to 300 μm, and even more preferably 30 μm to 200 μm. Within these ranges, the buildability and physical properties of the built-up article will be balanced more easily.

A first embodiment of the base in this invention relates to a thermoplastic resin base. While the thermoplastic resin base might be a molded article or part, it is preferably a film or sheet. The resins employable in this case may be the same as the resins described above in relation to the thermoplastic resin.

The thermoplastic resin contained in such thermoplastic resin base preferably belongs to the same category with the thermoplastic resin contained in the filament. Resins in the same category include polyolefin resins in the same category, polyamide resins in the same category, polyester resins in the same category, polycarbonate resins in the same category, styrene resins in the same category, polyoxymethylene resins in the same category, polyether ketones in the same category, polyethersulfones in the same category, and polyetherimides in the same category. With such design, adhesiveness between the filament and the base may be improved.

In another embodiment of this invention, both of the thermoplastic resin contained in the filament and the thermoplastic resin contained in the thermoplastic resin film are crystalline thermoplastic resins, with the difference between their melting points preferably fallen within 30° C., and more preferably within 10° C. With such design, heat sealing will become easier.

In particular in this invention, both of the thermoplastic resin contained in the filament and the thermoplastic resin contained in the thermoplastic resin film are preferably polyamide resins.

When the resins in the same category are used for the thermoplastic resin contained in the thermoplastic resin base and for the thermoplastic resin contained in the filament, the treatment to be provided onto the surface of the thermoplastic resin base is exemplified by grain finish and embossing.

Alternatively, for the thermoplastic resin contained in the base and the thermoplastic resin contained in the filament, it is also preferable to employ a combination of the thermoplastic resins other than in the same category.

When the combination of the thermoplastic resins other than in the same category is employed, the treatment to be provided is exemplified by corona discharge treatment and ozone treatment.

A second embodiment of the base in this invention relates a metal base. The metal base is preferably an aluminum foil. When the metal base is employed, the surface treatment is selectable from a wide range of chemical treatment and physical treatment which are generally applied to the metal base. The chemical treatment is exemplified by ozone treatment and plasma treatment, meanwhile the physical treatment is exemplified by filing.

A wide range of other combinations of the materials for composing the base and the filament are also employable, wherein the materials may be bonded by heat sealing, attached using adhesive or tacky agent, or fixed using tape or fitting such as metal fitting.

Examples

This invention will further be detailed referring to Examples. Note that materials, amounts of consumption, ratios, process details and procedures may suitably modified, without departing from the spirt of this invention. The scope of this invention is therefore not limited to specific Examples described below.

1. Thermoplastic Resin Used for the Filament

<Exemplary Synthesis 1: MP10>

Into a reactor equipped with a stirrer, a partial condenser, a total condenser, a thermometer, a dropping funnel, a nitrogen gas feeding tube and a strand die, placed were 10 kg (49.4 mol) of sebacic acid (TA grade, from Itoh Oil Chemicals Co., Ltd.) and 11.66 g of sodium acetate/sodium hypophosphite monohydrate (molar ratio=1/1.5), the inside of the reactor was thoroughly replaced with nitrogen gas, and the reaction system was heated up to 170° C. under stirring while feeding a small flow rate of nitrogen.

Into the molten sebacic acid, added under stirring was 6.647 kg of a mixed xylylenediamine that contains metaxylylenediamine (from Mitsubishi Gas Chemical Company, Inc.) and paraxylylenediamine (from Mitsubishi Gas Chemical Company, Inc.) with a molar ratio of 70/30 (34.16 mol of metaxylylenediamine, and 14.64 mol of paraxylylenediamine), and the inner temperature was continuously elevated up to 240° C. over 2.5 hours, while removing water released from the condensation reaction.

After completion of the dropping, the inner temperature was elevated, and upon reaching 250° C., the inside of the reactor was decompressed, the inner temperature was further elevated, kept at 255° C. for 20 minutes, so as to sustain melt polycondensation. The system was then pressurized with nitrogen gas, the resultant polymer was taken out through the strand die, and then pelletized to obtain polyamide resin MP10.

The thus obtained polyamide resin was found to have a melting point of 213° C., and a number-average molecular weight of 15,400.

MXD6: Metaxylylene adipamide resin, S6001 from Mitsubishi Gas Chemical Company, Inc., melting point 237° C., number-average molecular weight=16,800

Polycarbonate resin, S2000 from Mitsubishi Engineering-Plastics Corporation, Tg=151° C.

2. Reinforcing Fiber Used for Manufacturing the Filament

Continuous Carbon Fiber: Pyrofil-TR-50S-12000-AD from MITSUBISHI RAYON CO., LTD., 8,000 dtex, number of fibers=12,000 f, surface treated with epoxy resin.

Continuous Glass Fiber: from Nitto Boseki Co., Ltd., 1,350 dtex, the number of fibers=800 f.

3. Manufacture of Filament

<Manufacture of Filament 1>
<<Manufacture of Continuous Thermoplastic Resin>>

Thermoplastic resin (MP10) was melted in a single screw extruder with a 30 mm diameter screw, and extruded under 30° C. higher than melting point of thermoplastic resin through a 48 hole die into strands, drawn while being taken up onto a roll, to obtain a fiber bundle of the thermoplastic resin in the form of roll.

<<Manufacture of Commingled Yarn>>

The commingled yarn was manufactured following the method below.

The individual fibers were drawn out from ten spools of the continuous thermoplastic resin fiber and one spool of the continuous reinforcing fiber (continuous carbon fiber), and opened under air blow, while allowing them to pass through a plurality of guides. During the opening process, the continuous thermoplastic resin fibers and the continuous reinforcing fiber were bundled, further allowed to pass through a plurality of guides under air blow for advanced uniformity. The thus obtained fiber bundle was dipped in an aqueous solution containing a treatment agent (AQ-Nylon T70 from Toray Industries, Inc.) for 10 seconds, then dried at 40° C. for 60 minutes, to obtain a commingled yarn. The amount of the treatment agent in the commingled yarn was found to be 0.5% by weight.

The thus obtained commingled yarn was used as filament 1.

<Manufacture of Filament 2>

A commingled yarn from Schappe Techniques, composed of carbon fiber and polyamide 12, with a ratio by weight of 67.5 (CF)/32.5 (PA12) (Grade No. 41804) was used. The polyamide 12 was found to have a melting point of 175° C.

<Manufacture of Filament 3>

In the manufacture of the continuous thermoplastic resin fiber for filament 1, the thermoplastic resin used for manufacturing the commingled yarn was changed from MP10 to MXD6, while leaving all other procedures unchanged, to obtain filament 3.

<Manufacture of Filament 4>

In the manufacture of the continuous thermoplastic resin fiber for filament 1, the thermoplastic resin used for manufacturing the commingled yarn was changed from MP10 to polycarbonate resin, the melt discharge temperature was set to 280° C., and the treatment agent was changed to BPAtype epoxy resin-based treatment agent (EM-058, from ADEKA Corporation), while leaving all other procedures unchanged, to obtain filament 4.

<Manufacture of Filament 5>

In the manufacture of filament 1, the continuous carbon fiber was changed to a continuous glass fiber, the treatment agent was changed to 3-aminopropyltriethoxysilane (KBE-903, from Shin-Etsu Chemical Co., Ltd.), while leaving all other procedures unchanged, to obtain filament 5.

<Manufacture of Filament 6>

Thermoplastic resin (MP10) was melted in a single-screw extruder having a 30 mm diameter screw, and extruded through a 48 hole die into strands, at a temperature 30° C. higher than the melting point of the thermoplastic resin, drawn while being taken up onto a spool, to obtain a spooled continuous thermoplastic resin fiber bundle. The thus obtained continuous thermoplastic resin fiber bundle was used as filament 6.

<Manufacture of Filament 7>

A single continuous carbon fiber and 32 continuous thermoplastic resin fibers manufactured in Example 1 were fed to a braiding machine (from Kokubun Limited), and a 1.55 g/m braid was manufactured at a take-up speed of 10 cm/min.

4. Base

<Manufacture of Film>

Pellets of each resin dried in a vacuum drier were melted in the single-screw extruder having a 30 mm screw, extruded through a 500 mm wide T-die, the resultant film was pressurized between a pair of stainless steel rolls with textured surfaces, at a roll temperature of 30 to 70° C. depending on types of resin, and at a roll pressure of 0.4 MPa, to thereby form a film with textured surfaces.

For resins having melting points, the melt discharge temperature was set 30° C. higher than the melting points, meanwhile for polycarbonate resin film, the temperature was set to 280° C. The rate of discharge of resin and take-up speed were controlled so that each obtainable film will have the thickness listed in Table 3.

<Film>

MXD6: Polyamide MXD6 film, thickness of 100 μm
S6011(melting point=237° C.) from Mitsubishi Gas Chemical Company, Inc. is used as resin.
PA11: Polyamide 11 film, thickness of 100 μm
Rilsan BMN T TLD (melting point=185° C.) from Arkema S.A. is used as resin.
PA6: Polyamide 6 film, thickness of 100 μm
1024B (melting point=224° C.) from UBE INDUSTRIES, LTD. is used as resin.
MP10: Polyamide MP10 film, thickness of 50 μm
The resin referred at Exemplary Synthesis 1 is used as a resin.
PE: polyethylene film, thickness of 100 μm
NOVATEC UF240 (melting point=123° C.) from Japan Polyethylene Corporation is used as a resin.
PP: Polypropylene film, thickness of 180 μm
NOVATEC FY6 (melting point=170° C.) from Japan Polyethylene Corporation is used as a resin.
The obtained film was subjected to a corona discharge treatment
PET: Polyethylene terephthalate film, thickness of 50 μm
BK-2180 (melting point=250° C.) from Japan Unipet Co., Ltd.
PC: Polycarbonate film, thickness of 100 μm
S2000 from Mitsubishi Gas Chemical Company, Inc. is used as a resin.
Kapton (registered trademark): Polyimide film of commercial product from DU PONT-TORAY CO., LTD., thickness of 50 μm.

5. Examples and Comparative Examples

Example 1-1

Each filament obtained above was set on Solidoodle 3 (from Solidoodle), a part of the filament is drawn out, and bonded over a 2 cm range originated from the end, to the base listed in Table, at a heat sealing temperature listed in Table.

Next, the filament was discharged through the nozzle that is moving so as to draw circles, at the discharge temperature (heating temperature inside the nozzle) listed in Table, at an discharge rate of 5 mm/second, onto the base listed in Table. The base was heated so as to achieve the heating temperature listed in Table. A gap between the base and the tip of the nozzle was controlled to 2 mm. Solidoodle 3 used here had been modified by connecting thereto a variable transformer, so as to enhance the output. The obtained three-dimensional structure was found to be 1 mm thick at the thinnest portion. The discharge was accomplished, without operating the drive gear of Solidoodle 3 (from Solidoodle).

<<Measurement of Bond Strength>>

The bond strength between the filament and the base was defined by the value measured by the method described below. The base used in the measurement is same as the base used in the manufacturing method described above, meanwhile the filament used was a 60 mm section cut out from the filament. If the base has been treated on the surface, also the base used for measuring bond strength was treated in the same way.

Figure 4:
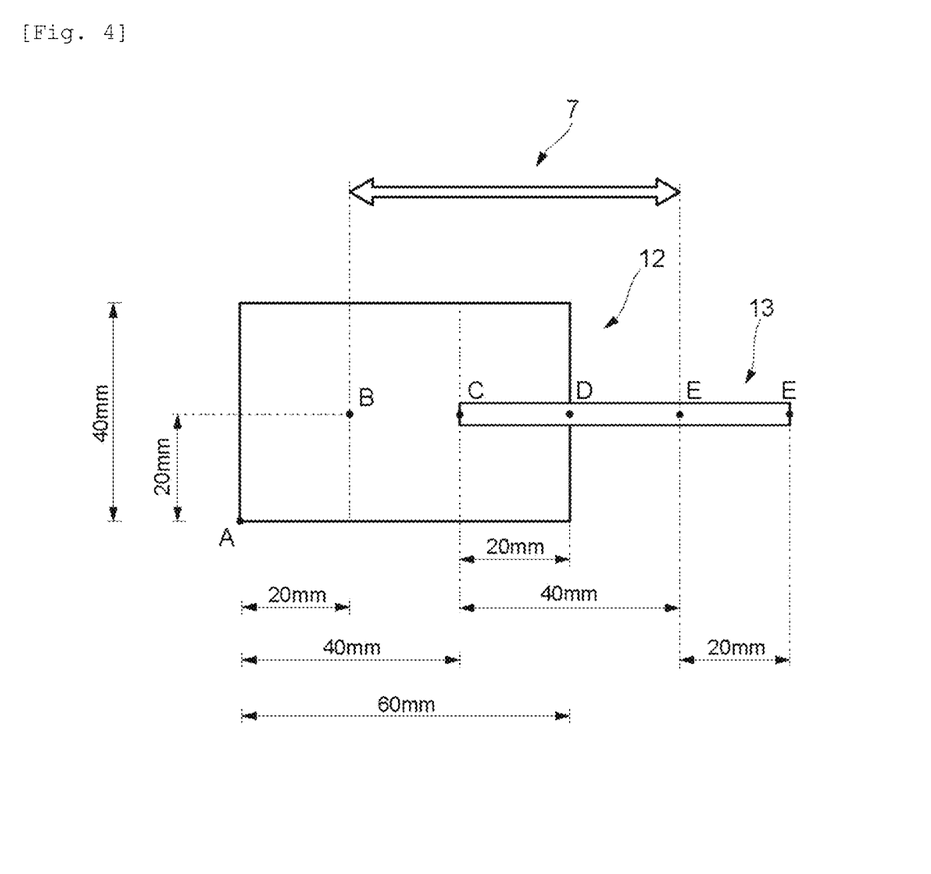
FIG. 4 is a schematic drawing illustrating a method for measuring bond strength in this invention.

As illustrated in FIG. 4, the base 12 was cut into a 40 mm-long×60 mm-wide rectangular piece; a 60 mm-long filament 13 was bonded to the cut base 12 over a 20 mm-range (up to point D in FIG. 4) in parallel with the lateral side of the cut base 12, so that the filament originates from a point (point C in FIG. 4) on the cut base laterally 40 mm-away and longitudinally 20 mm-away from one apex (point A in FIG. 4) of the cut base. The bonding was accomplished in the same way as in the manufacture of the three-dimensional structure. Then using a pair of chucks, a point (point B in FIG. 4) on the cut base laterally 20 mm-away and longitudinally 20 mm-away from the apex (point A in FIG. 4) of the cut base, and a point (point E in FIG. 4) on the filament longitudinally 40 mm-away from the originating point (point C in FIG. 4) thereof, were brought apart from each other in the direction parallel to the cut base plane at a tensile speed of 5 mm/second, then the force necessary for detaching the filament 13 was determined as bond strength. That is, the span of arrow 7 in FIG. 4 (distance between points B and E in FIG. 4) represents the chuck-to-chuck distance, which was kept to 60 mm during pulling.

<<Buildability>>

The obtained three-dimensional structures were evaluated as below.
A: Three-dimensional structure obtained as designed.
B: Three-dimensional structure obtained as designed, with a slight surface irregularity.
C: Three-dimensional structure not obtained as designed.
D: Three-dimensional structure not obtainable.

Other Examples and Comparative Examples

The procedures were conducted in the same way as in Example 1-1, except that types of the filament, types of the base, heat sealing temperature, discharge temperature, and base heating temperature were changed as listed in Tables.

Example 3-5 that used the braid composed of the continuous thermoplastic resin and the continuous reinforcing fiber, rather than the commingled yarn, was found to need longer time for impregnation of the continuous thermoplastic resin fiber.

TABLE 1

|  | Example 1-1 | Example 1-2 | Example 1-3 | Example 1-4 | Comparative Example 1-1 | Example 1-5 | Example 1-6 | Comparative Example 1-2 |
| --- | --- | --- | --- | --- | --- | --- | --- | --- |
| Type of Filament | | | | Filament 1 | | | | |
| Type of Base | MXD6 | PA11 | PA6 | MP10 | PE | PP | PET | Kapton |
| Heat sealing Temperature (° C.) | 243 | 243 | 243 | 243 | 243 | 243 | 243 | 243 |
| Bond Strength (N) | 34 | 38 | 35 | 36 | 6 | 60 | 17 | 7 |
| Discharge Temperature (° C.) | 243 | 243 | 243 | 243 | 243 | 243 | 243 | 243 |
| Base Heating Temperature (° C.) | 80 | 80 | 80 | 80 | 60 | 60 | 80 | 80 |
| Buildability | A | A | A | A | C | B | B | C |

TABLE 2

|  | Example 2-1 | Example 2-2 | Example 2-3 | Example 2-4 | Comparative Example 2-1 | Comparative Example 2-2 | Example 2-5 | Comparative Example 2-3 |
| --- | --- | --- | --- | --- | --- | --- | --- | --- |
| Type of Filament | | | | Filament 2 | | | | |
| Type of Base | PA11 | PA6 | MXD6 | MP10 | PE | PP | PET | Kapton |
| Heat sealing Temperature (° C.) | 205 | 205 | 205 | 205 | 205 | 205 | 205 | 205 |
| Bond Strength (N) | 36 | 41 | 34 | 44 | 10 | 13 | 16 | 8 |
| Discharge Temperature (° C.) | 205 | 205 | 205 | 205 | 205 | 205 | 205 | 205 |
| Base Heating Temperature (° C.) | 70 | 70 | 70 | 70 | 60 | 60 | 70 | 70 |
| Buildability | A | A | A | A | C | C | B | C |

TABLE 3

|  | Example 3-1 | Example 3-2 | Example 3-3 | Example 3-4 | Example 3-5 |
| --- | --- | --- | --- | --- | --- |
| Type of Filament | 3 | 4 | 5 | 6 | 7 |
| Type of Base | MXD6 | PC | MP10 | MP10 | MP10 |
| Heat sealing Temperature (° C.) | 267 | 280 | 243 | 233 | 243 |
| Bond Strength (N) | 36 | 30 | 32 | 35 | 34 |
| Discharge Temperature (° C.) | 267 | 280 | 243 | 233 | 243 |
| Base Heating Temperature (° C.) | 80 | 80 | 80 | 80 | 80 |
| Buildability | A | A | A | A | A |

As is clear from Tables above, the manufacturing method of this invention made it possible to manufacture the three-dimensional structures that excel in buildability. Within the bond strength from 20 to 50 N (Examples 1-1 to 1-4, Examples 2-1 to 2-4, Examples 3-1 to 3-5), particularly good three-dimensional structures were obtained irrespective of the types of materials.

On the other hand, when the bond strength between the filament and the base was poor (Comparative Examples 1-1, 1-2, Comparative Examples 2-1 to 2-3), the filament got kinked, and the three-dimensional structures could not be obtained as designed.

Example 3-4 that used the filament, composed of the continuous thermoplastic resin but without using the reinforcing fiber, showed good buildability, but the filament tended to break easily if moved fast.

When the filament and the base were not bonded in Example 1-1, the filament could not be built up over the surface of the base, and the three-dimensional structure per se could not be obtained.

On the other hand, when the filament and the base were bonded in Example 1-1 using an adhesive (Maxive M-100, C-93 from Mitsubishi Gas Chemical Company), rather than heat sealing them, so as to achieve the same bond strength as in Example 1-1, obtainable was the three-dimensional structure that excels in buildability, just like in Example 1-1.

DESCRIPTION OF REFERENCE NUMERALS 1 3D printer nozzle
2, 12 base
3, 13 filament
4 bonding point between base and filament
5 spool of filament
6 three-dimensional structure
7 An arrow indicating distance and direction of pulling the filament and the base

What is claimed is:

1. A method for manufacturing a three-dimensional structure, the method comprising melting a filament that contains a thermoplastic resin by using a 3D printer, and depositing it onto a base, and comprising setting the filament in a 3D printer, drawing out a part of the filament through a nozzle of the 3D printer, bonding the filament at one end of the filament to a surface of the base so as to achieve a bond strength to the base of 20 to 50 N, after one end of the filament is bonded to the surface of the base, driving the 3D printer to discharge the filament, at a discharge temperature of 15 to 60° C. higher than the melting point of the thermoplastic resin, through the nozzle of the 3D printer onto a surface of the base so as to deposit thereon, while moving at least one of the base or the nozzle, where, the bond strength is measured by cutting the base into a 40 mm-long×60 mm-wide rectangular piece; bonding a 60 mm-long filament to the cut base over a 20 mm-range in parallel with the lateral side of the cut base, so that the filament originates from a point on the cut base laterally 40 mm-away and longitudinally 20 mm-away from one apex of the cut base; bringing a point on the cut base laterally 20 mm-away and longitudinally 20 mm-away from the apex of the cut base, and a point on the filament longitudinally 40 mm-away from the originating point thereof, apart from each other in the direction parallel to the cut base plane at a tensile speed of 5 mm/second; then finding the force necessary for detaching the filament, wherein the filament comprises a commingled yarn that contains a continuous reinforcing fiber and a continuous thermoplastic resin fiber, the continuous reinforcing fiber being dispersed in the continuous thermoplastic resin fiber such that at least a portion of the continuous thermoplastic resin fiber remains in the fiber form, and is not impregnated into the continuous reinforcing fiber, the continuous thermoplastic resin fiber has a number-average fiber length of 1 m or longer, and the continuous reinforcing fiber has a number-average fiber length of 1 m or longer, and the ratio of the continuous reinforcing fiber in the commingled yarn is 40% by weight or more, and the ratio of the continuous thermoplastic resin fiber in the commingled yarn is 35% by weight or more, a total number of fibers used for manufacturing a single commingled yarn, which is a sum of a total number of fibers of continuous thermoplastic resin fiber and a total number of fibers of continuous reinforcing fiber, is 1,000 to 100,000 f; and the continuous reinforcing fiber in the commingled yarn fiber has a dispersity of 60 to 100%.

2. The method for manufacturing a three-dimensional structure of claim 1, wherein the thermoplastic resin is a polyamide resin.

3. The method for manufacturing a three-dimensional structure of claim 1, wherein the thermoplastic resin contains a structural unit derived from diamine and a structural unit derived from dicarboxylic acid, and 50 mol % or more of the structural unit derived from diamine is derived from xylylenediamine.

4. The method for manufacturing a three-dimensional structure of claim 1, wherein the base is a thermoplastic resin base.

5. The method for manufacturing a three-dimensional structure of claim 4, wherein the thermoplastic resin contained in the filament and the thermoplastic resin contained in the thermoplastic resin base belong to the same category.

6. The method for manufacturing a three-dimensional structure of claim 4, wherein both of the thermoplastic resin contained in the filament and the thermoplastic resin contained in the thermoplastic resin base are polyamide resins.

7. The method for manufacturing a three-dimensional structure of claim 4, wherein the filament is bonded to the base by heat sealing.

8. The method for manufacturing a three-dimensional structure of claim 4,
wherein the thermoplastic resin contained in the filament and the thermoplastic resin contained in the thermoplastic resin base belong to the same category; and
the thermoplastic resin contains a structural unit derived from diamine and a structural unit derived from dicarboxylic acid, and 50 mol % or more of the structural unit derived from diamine is derived from xylylenediamine.

9. The method for manufacturing a three-dimensional structure of claim 1, wherein a discharge speed is set to 1 to 100 mm/second.

10. The method for manufacturing a three-dimensional structure of claim 1, wherein a distance between a tip of the nozzle and the base is 3 mm or less.

11. The method for manufacturing a three-dimensional structure of claim 1, wherein the filament is deposited on the base with the base having a temperature of 50 to 100° C.

12. The method for manufacturing a three-dimensional structure of claim 1, wherein the reinforcing fiber is a carbon fiber and/or a glass fiber.

13. The method for manufacturing a three-dimensional structure of claim 1, wherein the reinforcing fiber is a carbon fiber and/or a glass fiber, and the thermoplastic resin fiber is a polyamide resin fiber.

* * * * *